United States Patent [19]

Kornely et al.

[11] Patent Number: 4,508,768
[45] Date of Patent: Apr. 2, 1985

[54] PROTECTIVE LINER FOR VESSELS

[75] Inventors: Edward B. Kornely, Two Rivers; Gerald T. Paul, Manitowoc, both of Wis.

[73] Assignee: Newell Companies, Inc., Manitowoc, Wis.

[21] Appl. No.: 510,948

[22] Filed: Jul. 5, 1983

[51] Int. Cl.³ ............................................. B65D 21/00
[52] U.S. Cl. ..................................... 428/35; 206/516; 206/518; 206/519; 206/520
[58] Field of Search ................... 428/35; 206/501, 516, 206/518, 519, 520

[56] References Cited

U.S. PATENT DOCUMENTS

| | | |
|---|---|---|
| 1,468,748 | 9/1923 | Schuman . |
| 3,038,601 | 6/1962 | Storck et al. . |
| 3,326,408 | 6/1967 | Ringlen . |
| 3,358,878 | 12/1967 | Ostborg et al. . |
| 3,637,073 | 1/1972 | Capuano . |
| 3,896,928 | 7/1975 | Forte . |
| 4,046,310 | 9/1977 | Gustafsson . |
| 4,113,095 | 9/1978 | Dietz et al. . |

Primary Examiner—John E. Kittle
Assistant Examiner—James J. Seidleck
Attorney, Agent, or Firm—Dorsey & Whitney

[57] ABSTRACT

A protective liner for vessels such as cooking pans, which have interior surfaces either natural or covered with thin, nonstick coatings. The liner protects the interior surfaces from damage during manufacturing, packing, shipping, unpacking and display by covering the surfaces. The liner also prevents vessels from binding together when they are nested, by spacing the vessels to prevent tight insertion of one vessel within another. The liner is made of a thin flexible material. Its edge section grasps the rim of the vessel to be protected, while its bottom web section and spacer web section substantially cover the interior surfaces of the vessel.

12 Claims, 6 Drawing Figures

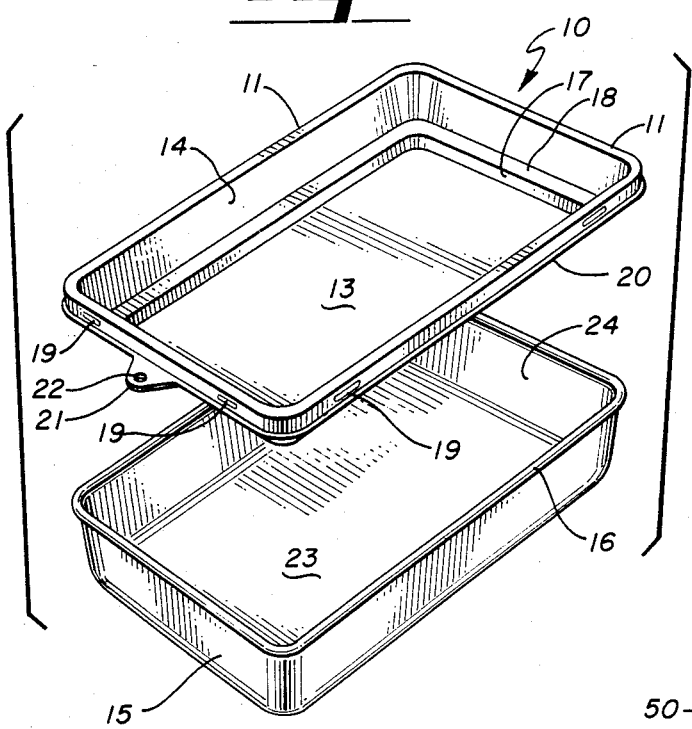
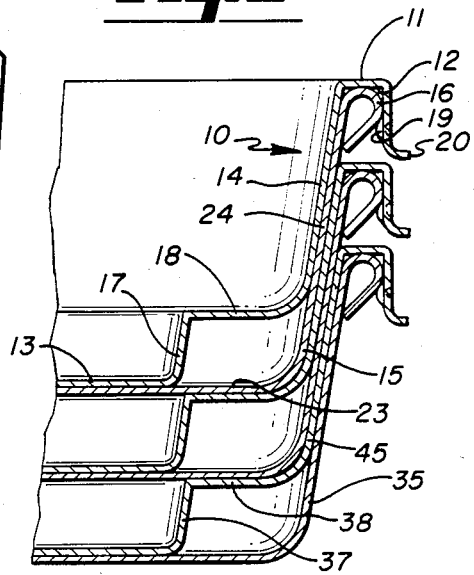
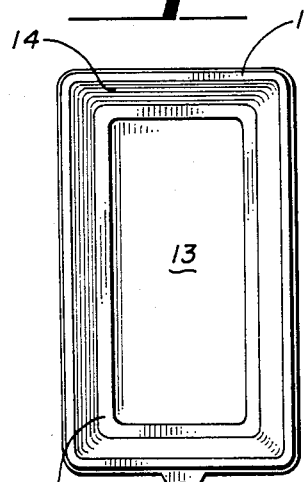
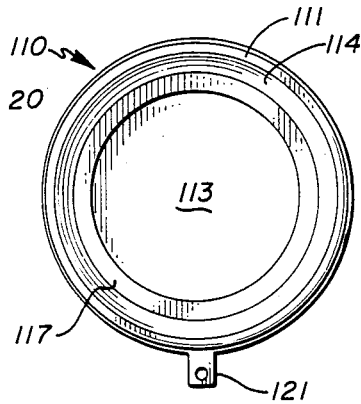
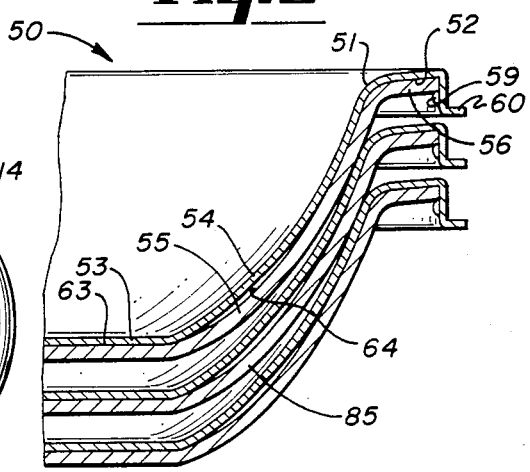
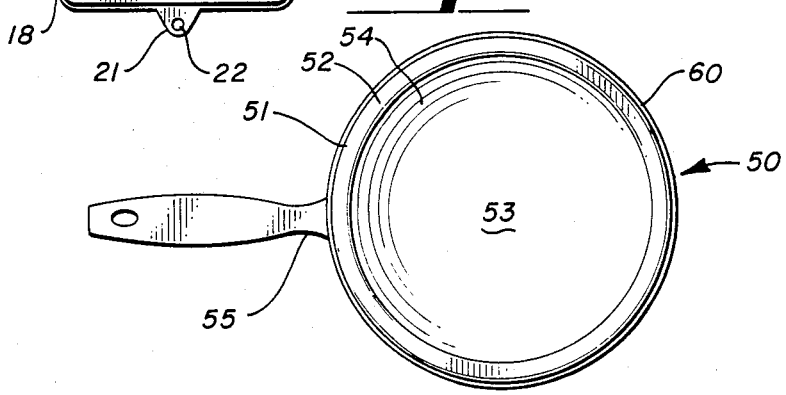

PROTECTIVE LINER FOR VESSELS

BACKGROUND OF THE INVENTION

1. Field of the Invention

The invention relates generally to the field of protective liners. More particularly, this invention relates to a protective liner which attaches to a flanged or beaded rim and covers substantially the entire interior of a pan or other vessel, whose interior surfaces are either natural (uncoated) or coated with a nonstick or other special material.

2. Description of the Prior Art

Vessels such as pots and pans are subject to much handling during manufacturing, packing, shipping, unpacking, and subsequent arrangement for display in stores and inspection by customers. This extensive handling can result in damage to the surfaces of the vessels. The problem of damage is especially acute where the vessel has an interior surface that is soft in its natural state or covered with a thin coating, such as the nonstick cooking coatings bearing the brand names Silverstone, Teflon or T-Fal, which have been developed and used for the interior surfaces of housewares in recent years. Damage to such natural surfaces or coatings such as scratching both reduces their utility and reduces their visual appeal to customers.

Damage is especially likely to occur when multiple vessels are fitted together in such a way that each subsequent vessel sits, or nests, within the preceding vessel.

A further problem which can occur is the predilection of vessels to bind together when they are nested, so that they are difficult to separate. This creates inconvenience to the handler, as well as greatly increasing the probability that surfaces of the vessel will be damaged either when the binding occurs, or during efforts made to separate vessels.

There is a need for a means for protecting surfaces of vessels during manufacturing, packing, shipping, unpacking, and display handling, and, particularly, for protecting surfaces while still allowing the convenience of nesting vessels. There is also a need for a way to prevent binding of vessels when they are nested.

SUMMARY OF THE INVENTION

The present invention provides a liner made of a thin film of flexible material for protecting the interior surface of a vessel, such as a baking pan, which has a flanged or beaded rim.

The liner has an edge section with a channel that fits over the rim of the pan. At least one resilient indentation on the edge section, which is temporarily displaced when the edge section is forced over the rim as the liner is inserted in the pan, holds the channel in place on the rim.

A bottom web section of the liner substantially covers the bottom surface of the pan and rests against it.

A spacer web section extending between the edge section and the bottom web section substantially covers a medial surface of the pan that lies between its rim and its bottom surface. A portion of the spacer web section is raised to stand away from the medial surface so that a second pan placed so as to nest within the first pan is prevented from lying tightly against the interior surfaces of the pan.

BRIEF DESCRIPTION OF THE DRAWINGS

FIG. 1 is an exploded perspective view of a liner with rectangular pan counterpart in accordance with the present invention;

FIG. 2 is a fragmentary cross sectional elevation of a plurality of liners and pans as in FIG. 1, but with the liners in place;

FIG. 3 is a top plan view of a liner for a rectangulr pan, more narrow and deeper than as shown in FIGS. 1 and 2 but otherwise similar;

FIG. 4 is a top plan view of a liner for a shallow round pan;

FIG. 5 is a top plan view of an alternate form of the invention in place on a frying or saute pan;

FIG. 6 is a fragmentary cross sectional elevation of a plurality of liners and pans as in FIG. 5.

DESCRIPTION OF THE PREFERRED EMBODIMENTS

The invention will be described with reference to three basic types of cooking vessels, although it will be clear that it is easily adaptable to a wide variety of other vessels. FIGS. 1, 2 and 3 show the invention as applied to a rectangular cake or bread-load type baking pan. FIG. 4 shows the invention as applied to a round pan. FIGS. 5 and 6 show the invention as adapted for a round, frying or saute pan.

As seen in FIGS. 1, 2 and 3, a protective liner 10 in accordance with the present invention is made of a thin film of clear, flexible material and has an edge section 11 formed with a channel 12, a bottom web section 13 and a spacer web section 14. The liner 10 is intended to be inserted in a vessel or pan 15 with a beaded rim 16, such as the rectangular baking pan 15 shown in FIG. 1, so as to fit snugly within the interior of the vessel.

The edge section 11 of the embodiment of the liner 10 shown in FIG. 1 is continuous around the top of the liner 10. It is formed as a channel 12 which has a plurality of resilient indentations 19 in the outer wall of the channel 12. These are located so as to fit below the rim 16 of the pan 15 when the channel 12 is in place covering the rim 16. The edge section 11 also includes a narrow, outwardly curved horizontal flange 20. It further includes, at one end, an outwardly pointing hanging tab 21. The tab 21 is perforated by a hole 22 for use in hanging the pan 15 with the liner 10 in place.

In the embodiment shown in FIGS. 1, 2 and 3, the edge section 11 is integrally formed with the bottom web section 13 and the spacer web section 14. The spacer web section 14 lies between the edge section 11 and the bottom web section 13. The bottom web section 13 lies against and substantially covers the bottom surface 23 of the pan 15. The spacer web section 14 substantially covers the medial surface 24 of the pan 15, a flat side wall in the instance of the pan shown in FIGS. 1, 2 and 3. The spacer web section 14 also has another important function, described next.

As mentioned above, the present invention is designed for use with pans which are nested. To avoid binding between nested pans and to prevent damage to surfaces which may result from binding, the spacer web section 14 is used to prevent surfaces of nested pans from coming into tight frictional contact. In the embodiment shown in FIGS. 1, 2 and 3, this is accomplished, in part, by including in the spacer web section 14 a spacing step 17 which is intended toward the interior of the pan 15, i.e., intended away from the adjacent bottom and medial surfaces, 23, 24, respectively, of the pan 15. As best seen in FIG. 2, the spacing step 17 has a support surface 18 on which the exterior of the bottom surface of one pan may rest when it is nested with another.

The spacing step 17 in this embodiment extends continuously around the lower edge of the spacer web section 14 at the point where it joins the bottom web section 13. It will be clear, however, that it need not be continuous as long as it provides sufficient support for a nested pan. It will further be clear that the spacing step 17 might equally be considered a part of the bottom web section 13, as it exists where the spacer web section 14 and the bottom web section 13 are joined. It will also be clear that the support surface 18 may be of any desired width. In fact, it might be widened to the point where the entire bottom web section 13 is subsumed in the support surface 18. In that case, the bottom web section 13 would still cover the bottom of the vessel but would rest slightly above it rather than against it.

For use, the liner 10 is inserted within the pan 15 and pressure is applied to force the channel 12 of the edge section 11 over the rim 16 of the pan 15. The resilient indentations 19 along with the adjacent portions of the edge section 11 are displaced outwardly under light pressure. Once the channel 12 is fitted over the rim 16 of the pan 15, the resilient indentations 19 rest underneath the rim 16 to hold the channel 12 in place. The bottom web section 13 of the liner 10 then substantially covers the bottom surface 23 of the pan 15 and the spacer web section 14 of the liner 10 substantially covers the medial surface 24 of the pan 15. The edge section 11 covers the pan rim 16.

Although the embodiment in FIG. 1 shows a plurality of spaced indentations 19, the liner 10 might also be held in place by a continuous indentation running around the entire circumference of edge section 11 or other similar means for holding the channel 12 in place.

The horizontal flange 20 of the edge section 11 facilitates removal of the liner 10 from the pan 15. Outward and upward pressure on the flange 20 releases one or more of the indentations 19 from below the rim 16 of the pan 15, so allowing the liner 10 to be lifted out of the pan 15.

The tab 21 may be a further aid for removal of the liner 10. It provides a convenient place to grasp the liner 10 for removal. A user may grasp the tab 21 and pull outwardly and upwardly to release the indentation or indentations 19 closest to the tab 21, so allowing the liner 10 to be removed from the pan 15.

The tab 21 further serves as an aid in the commercial display of the pan 15 in a store. The perforation hole 22 of the tab 21 may be threaded over a protruding rod or bar so that the pan 15 with liner 10 is suspended. Several pans can be so suspended, with adjacent pans nested, so that the pans are effectively displayed in a small space and can be easily removed from the display rod for purchase or for rearrangement of the merchandise.

The liner 10 is to be inserted within the pan 15 prior to any stacking, packing or shipment by the manufacturer. Where the interior surfaces of the pan 15 are soft metal or coated with a nonstick or other specialized coating, such as a Silverstone, Teflon or T-Fal coating, which is susceptible to scratching, the liner 10 should be inserted as soon as possible in the manufacturing process. The liner 10 can then protect the interior surfaces from scratching during further manufacturing steps or handling, during the process of packing the pans for shipment, during shipping itself, during unpacking and setup of a display in a store and when the pan 15 is handled by customers or sales people.

As mentioned, the liner 10 is especially useful where pans are nested for shipment, storage and display, which is a common practice in the trade. Nesting increases the probability of scratching, so that protection is very important under those circumstances. In addition to protecting the interior surfaces and edges of each nested pan, the liner 10 faciliates handling of the pans. When pans are nested, as shown in the lower portion of FIG. 2, the spacing step 37 of the spacer web section of the liner for external pan 35 prevents the adjacent nested pan 45 from fitting tightly, by limiting the distance the pan 45 can travel downward when it is inserted within the external pan 35. In the embodiment shown in FIG. 2, the pan 45 rests on the support surface 38 of the spacing step 37 of the liner of the external pan 35. With the travel distance so limited, the pan 45 will not fit so tightly within the external pan 35 as to bind with the external pan 35. In addition, the exterior of the pan 45 rests against the relatively slippery surface of the liner for pan 35. This facilitates separation of pans during unpacking, storage and display, and allows a prospective customer to easily remove a pan from a nested store display, in order to inspect it before making a purchase decision. If the pan is not purchased, the customer or a clerk may return it to the display. There is no risk of scratching the internal surfaces of the inspected pan or the adjacent nested pan, as those surfaces are protected by the liners of the present invention.

As an additional benefit, the external surfaces of pans which are nested adjacent a liner are also protected from damage, as they contact only the liner of the pan into which they nest. A further benefit of the embodiment shown in FIGS. 1, 2 and 3 is that the liner aids stacking the pans with consistent spacing, thus facilitating counting or numerical comparison of stacks.

The protection given by the liner may continue once a pan with liner is in the hands of the ultimate consumer. While it is recommended that the consumer discard the liner, in fact, the liner may be utilized for the entire life of the pan. It may be removed for cooking and replaced within the pan after use, to protect the surfaces pending the next use. The consumer must, however, exercise caution in removing the liner before use and replacing it only after the pan is cool.

FIG. 4 shows a liner 110 which is a variation of the liner as shown in FIGS. 1, 2 and 3. This variation is adapted to a round pan. As can be seen, this adaptation has the same kind of edge section 111, spacer web section 114 and bottom web section 113 as in the embodiment for a rectangular pan. The spacing step 117 is continuous around the circumference of the liner 110 at the line where the spacer web section 114 and the bottom web section 113 meet. A tab 121 for hanging is also present.

Another embodiment of the invention is shown in FIGS. 5 and 6. The liner 50 of this embodiment is adapted to fit into and protect a circular frying or saute pan 55. Like the baking pan 15 of the first embodiment, the pan 55 has a rim 56, although the shape of the rim is of a flange type. The pan 55 also has a flat bottom surface 63, but the medial surface 64 which joins the rim 56 and the bottom surface 63 is curved, rather than straight, as in the baking pan. This presents a slightly different situation.

The general configuration of the liner 50 remains, however, much the same. Again, there is an edge section 51 which is roughly in the shape of a channel 52. The exterior wall of the channel 52 has indentations 59 to hold the edge section 51 on the rim 56, as well as an outwardly horizontal flange 60. A bottom web section 53 lies against the bottom surface 63 of the pan 55. A hanging tab is unnecessary, as the pan 55 can be hung by its handle.

Protection for the medial surface 64 is provided by a spacer web section 54. Due to the shape of the medial surface 64, the danger of binding between nested pans is less and, depending on the angles involved, no spacing step may be necessary. The presence of the spacer web section 54 alone may be sufficient for protection. However, for greater certainty that no binding will occur, the spacer web section 54 can be made to stand away slightly from the curvature of the medial surface 64, as best seen in FIG. 6.

As can further be seen in FIG. 6, in this embodiment, if the pan 55 is nested within a second pan 85 with liner, the pan 55 can be inserted into the pan 85 only until the bottom of the pan 55 reaches a level on the spacer web section of the liner for pan 85, where the circumferential dimension of the spacer web section is the same as the outside circumferential dimension of the pan 55. When the nesting of pans is thus limited, adjacent pans will not bind together. This embodiment of the liner of the present invention is particularly appropriate for use with relatively shallow pans, such as frying or saute pans, where binding is less likely to occur than in deep pans, and where the depth of the liner is not so great that construction of the spacer web section 54 so that it intersects with the bottom web section 53 at an obtuse angle will lead to structural weakness of the liner.

An appropriate material for the construction of the liner of the present invention is plastic, such as clear polyvinylchloride (PVC; sold, e.g., as American Hoechst #1002). An appropriate method of construction is to vacuum form the plastic to the desired shape using a web of 0.015 inches thickness. A transparent plastic is particularly desirable for liners to be used on goods that are displayed for consumer purchase. When transparent plastic is used, a prospective customer is able to view the interior surface of a pan through the liner. Also, a transparent liner enables a manufacturer to insert labels or literature relating to the source of the pan and to its use and care, between the liner and the pan bottom, where the prospective customer can read the literature with the liner still in place. The literature is then freely removable by the customer following removal of the transparent liner. This avoids the need to attach the literature to the pan in some way, or risk its separation from the pan during handling.

It is evident that there can be minor changes from the embodiments that are shown without departing from the spirit and scope of the invention. For example, the liner might be constructed of a material other than the above-identified plastic; the tab can be positioned anywhere convenient to use and to the shape of the pan; and neither the edge section nor the spacer web section would have to run continuously around the pan, but rather can be sectionalized or segmented.

It will, therefore, be obvious to one skilled in the art that a number of modifications can be made to the above-described preferred embodiments without essentially changing the invention. Accordingly, while the preferred embodiments of the invention have been described and illustrated, it is to be understood that the invention is not limited to the precise constructions herein disclosed, and the right is reserved to all changes and modifications coming within the scope of the invention as defined in the appended claims.

What is claimed as new and desired to be protected by Letters Patent is:

1. A liner made of a thin film of flexible material for packaging and protecting the interior surfaces of a vessel having a rim, a bottom surface and a medial surface which lies between the rim and the bottom surface, comprising:

an edge section for attachment to the rim of the vessel, said edge section having a channel which fits over the rim of the vessel along the full length of the rim and further having means for holding the channel in place on the full length of the rim;

a bottom web section which covers the entire bottom surface of the vessel when the liner is in place in the vessel; and a spacer web section extending between the edge section and the bottom web section which covers the entire medial surface of the vessel.

said spacer web section including a spacing portion raised inwardly so as to stand away from the medial surface of said vessel, such that when a second vessel of the same shape is nested within the vessel, the second vessel is prevented from lying tightly against the interior surfaces of the vessel.

2. The liner of claim 1 wherein at least a portion of the bottom web section rests substantially flat against the bottom surface of the vessel.

3. A liner made of a thin film of flexible material for packaging and protecting the interior surfaces of a vessel having a rim, a bottom surface and a medial surface which lies between the rim and the bottom surface, comprising:

an edge section for attachment to the rim of the vessel, said edge section having a channel which fits over the rim of the vessel along the full length of the rim and further having at least one resilient indentation which is temporarily displaced when the channel of the edge section is forced over the rim and which aids the channel to grasp the full length of the rim;

a bottom web section which covers the entire bottom surface of the vessel and rests substantially flat against it when the liner is in place in the vessel; and a spacer web section extending between the edge section and the bottom web section, which covers the entire medial surface of the vessel, said spacer web section including a spacing portion raised inwardly so as to stand away from the medial surface of said vessel, such that when a second vessel of the same shape is nested within the vessel, the second vessel is prevented from lying tightly against the interior surfaces of the vessel.

4. The liner of claim 3 wherein the edge section includes means to facilitate removal of the liner from the vessel.

5. The liner of claim 4 wherein the facilitating means is an outwardly directed flange which is substantially perpendicular to the spacer web section.

6. The liner of claim 3 wherein the edge section includes an outwardly pointing hanging tab.

7. The liner of claim 6 wherein the hanging tab is perforated so as to provide a means for suspending the vessel and liner.

8. The liner of claim 3 wherein the thin film of flexible material is thin, substantially transparent plastic.

9. The liner of claim 3 wherein the spacing portion of the spacer web section comprises a steplike inward indentation at the line at which the bottom web section and the spacer web section are joined.

10. The liner of claim 9 wherein the steplike inward indentation is continuous along the line at which the bottom web section and the spacer web section are joined.

11. The liner of claim 3 wherein the edge section, the bottom web section and the spacer web section are all integrally formed as one piece.

12. A liner made of a thin film of flexible material for packaging and protecting the interior surfaces of a vessel having a rim, a bottom surface and a medial surface which lies between the rim and the bottom surface, comprising:

an edge section for attachment to the rim of the vessel, said edge section having a channel which fits over the rim of the vessel along the full length of the rim and further having at least one resilient indentation which is temporarily displaced when the channel of the edge section is forced over the rim and which aids the channel to grasp the full length of the rim;

a bottom web section which covers the entire bottom surface of the vessel, said bottom web section including a spacing portion raised inwardly so as to stand away from the bottom surface of said vessel, such that when a second vessel of the same shape is nested within the vessel, the second vessel is prevented from lying tightly against the interior surfaces of the vessel; and a spacer web section extending between the edge section and the bottom web section, which covers the entire medial surface of the vessel.

* * * * *